Figure 1:
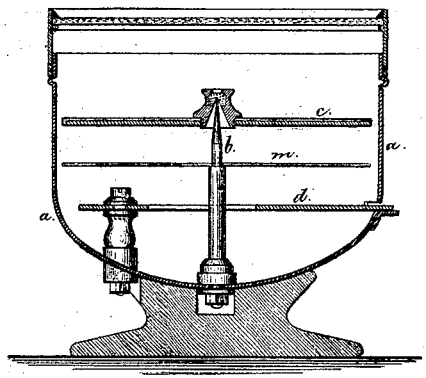

H. GLOVER.
Improvement in Local Attraction-Indicator for Ship-Compasses.
No. 131,435. Patented Sep. 17, 1872.

Witnesses,
Chs. H. Smith
Geo. W. Walker

Inventor
Henry Glover
Lemuel W. Serrell
atty

UNITED STATES PATENT OFFICE.

HENRY GLOVER, OF BROOKLYN, NEW YORK.

IMPROVEMENT IN LOCAL-ATTRACTION INDICATORS FOR SHIPS' COMPASSES.

Specification forming part of Letters Patent No. 131,435, dated September 17, 1872.

*To all whom it may concern:*

Be it known that I, HENRY GLOVER, of Brooklyn, in the county of Kings and State of New York, have invented an Improved Local-Attraction Indicator; and the following is declared to be a correct description of the same.

Marine and other compasses are very often deflected by local attraction from the magnetic meridian, and these deflections frequently lead to grave errors in calculations and often to accidents. This is particularly the case with iron vessels, and the various compasses on such vessels are tested and the local influence allowed for; but as this influence sometimes varies, and may change according to the course the ship is running, it becomes of the utmost importance to obtain an instrument that will indicate the extent of local attraction.

Compasses have been made with a variety of appliances, such as primary and secondary needles and magnets, but in consequence of the varying positions of the parts to the local attractions and magnetic influences they frequently become changed in the extent or polarity.

My improvement is not a compass. Its construction is such as to absolutely preclude its use as such. My instrument is simply an indicator to ascertain local attraction, in order that in reckoning by the ordinary compass the local attraction may be allowed for; and this instrument is so constructed that it may be adjusted from time to time, and when positioned near an ordinary compass, or in the place to be occupied by such compass, will indicate the number of degrees variation that will be produced in that compass by the local attraction.

I make use of two needles or magnets—one a swinging needle or indicator; the other, a fixed but adjustable needle or magnet, and the power of the latter is just sufficient to reverse the polarity of the swinging needle and hold it in any position to which the case and fixed magnet may be turned when the indicator is only exposed to one influence from the magnetic current. When this indicator is subjected to the compound influence resulting from local attraction and the magnetic current, a variation is indicated by the swinging needle equal in amount to the variation to which the compass will be exposed under like circumstances. The variation indicated by my instrument is probably due to the reversed polarity of the fixed magnet and the swinging needle, as influenced by the two forces of local and magnetic currents, for my indicating instrument will denote, in degrees, the force of local attraction generally, regardless of the position of the instrument to the true north and south lines.

Figure 2:
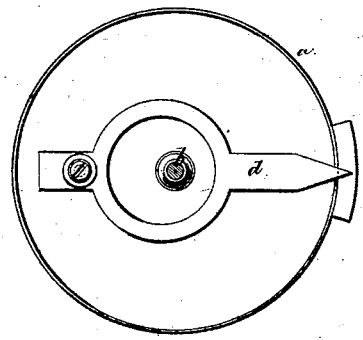
Figure 4:
Figure 3:
Figure 5:
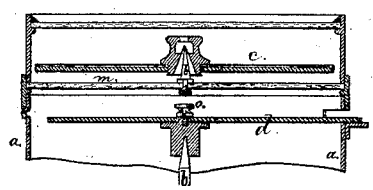

In the drawing, Figure 1 is a vertical section of said indicator. Fig. 2 is a plan of the fixed magnet. Figs. 3 and 4 are plans of modifications in the shape and mode of adjusting the fixed magnet; and Fig. 5 is a section of the indicating instrument with the needle between two glasses.

The bowl or case $a$ is of suitable size or shape, and contains a pintle, $b$, for the indicating-needle $c$; and $d$ is the controlling-magnet that is sufficiently powerful to reverse the needle $c$ and hold it when the compass is placed in any position and free from local attraction. This needle $d$ may be in the form shown in Figs. 1 and 2, where an opening is provided in the needle $d$ sufficiently large to allow for the pintle $b$ to pass, and the needle $d$ to be adjusted to such a point that the neutral magnetic center of $d$ shall coincide with the pintle $b$, and thereby the action of the magnet $d$ will be uniform on the needle $c$ in any position. The end of $d$ may project through the case, so as to be moved in adjusting the needle $d$; or the needle $d$ may be provided with a sleeve passing over the pintle $b$, and secured by a clamp-screw, $i$, so as to correctly position the needle, as in Fig. 3.

With a needle of the character aforesaid it is important that an adjustment, laterally, should be provided. I, therefore, make a transverse slot in line with the pivot, and secure the needle, when adjusted, by a set-screw, $o$, as seen in Figs. 4 and 5.

A disk of non-conducting material may be employed, as at $m$, to lessen the action of one needle on the other. This may be of mica or glass. In Fig. 5 I have shown this sheet of non-conducting material as a glass, to which the pivot or pintle $b$ is attached.

The distance, vertically, between the magnet $d$ and needle $c$ may be varied, so as to regulate the force of the controlling-magnet $d$ upon the needle $c$.

By adjusting the parts of this instrument, when free from local attraction as aforesaid, the same becomes a true indicator of the local attraction when exposed to the same, so that compasses can be rated and the variations allowed for.

I claim as my invention—

The local-attraction-indicating instrument, made with the adjustable magnetic needle $d$, having sufficient power to reverse and hold the indicating-needle $c$ when free from local attraction, in combination with said indicating-needle $c$, substantially as and for the purposes set forth.

Signed by me this 7th day of February, A. D. 1872.

HENRY GLOVER.

Witnesses:
GEO. T. PINCKNEY,
CHAS. H. SMITH.